United States Patent [19]

Chenin et al.

[11] 4,148,163

[45] Apr. 10, 1979

[54] SYNCHRONIZING MECHANISM FOR THE UNFOLDING OF CARRIER ELEMENTS FOR SOLAR CELLS

[75] Inventors: Claude Chenin, Cannes-la-Bocca; Jean-Claude A. Vermalle, Mandelieu, both of France

[73] Assignee: Societe Nationale Industrielle Aerospatiale, Paris, France

[21] Appl. No.: 805,424

[22] Filed: Jun. 10, 1977

[30] Foreign Application Priority Data

Jun. 18, 1976 [FR] France ............................... 76 18594

[51] Int. Cl.² .......................... F16H 1/14; F16H 1/20; B64G 1/10
[52] U.S. Cl. ......................................... 52/71; 244/173
[58] Field of Search ..................... 74/417, 25; 49/324; 52/71; 244/173; 132/895 A

[56] References Cited

U.S. PATENT DOCUMENTS

| 3,440,900 | 4/1969 | Neal .................................. 74/417 X |
| 3,449,976 | 6/1969 | Fergason ........................... 74/417 X |
| 3,525,483 | 8/1970 | Alstyne ............................. 244/173 |
| 3,733,758 | 5/1973 | Maier et al. .................... 244/173 X |
| 3,975,872 | 8/1976 | Pinero ...................................... 52/71 |

*Primary Examiner*—Leonard H. Gerin
*Attorney, Agent, or Firm*—McNenny, Pearne, Gordon, Gail, Dickinson & Schiller

[57] ABSTRACT

The synchronizing mechanism for the unfolding of articulated carrier elements which are outwardly extendable or inwardly retractable in a bellows-type arrangement on each side of a satellite body comprises a system of gear-train units placed alternately at one end of a driving carrier element. The mechanism is adapted to cooperate with at least one drive motor for folding-back or unfolding the carrier elements.

10 Claims, 1 Drawing Figure

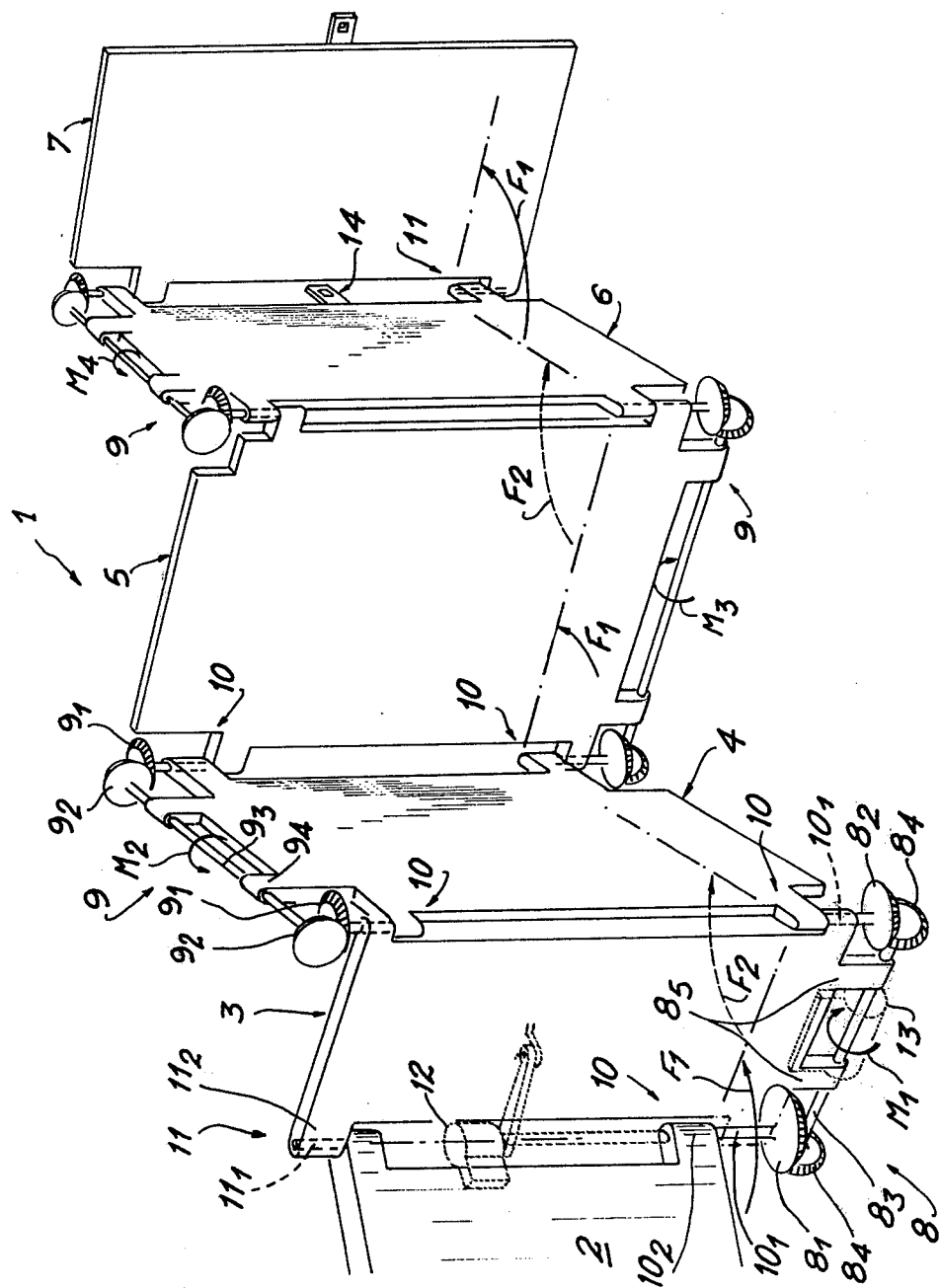

SYNCHRONIZING MECHANISM FOR THE UNFOLDING OF CARRIER ELEMENTS FOR SOLAR CELLS

This invention relates to a mechanism for unfolding articulated elements from a position in which said elements are folded-back especially in a bellows-type assembly while carrying out a synchronous movement of each element which is subjected to angular displacement but in a different direction from one element to the next.

The invention is more especially applicable to a mechanism of this type for carrying out in outer space the unfolding of successive flat elements which carry solar cells or voltaic cells, these elements being so designed as to extend on each side of a satellite body in order to constitute two panels having a large surface area in the outwardly extended position.

It can readily be understood that, in the case of panels formed of elements which are intended to carry solar cells, excellent coordination must be achieved between the different movements of said elements which are articulated from one edge to the other in each panel, especially with a view to preventing uncontrolled unfolding movements or untimely displacements which would be liable to introduce harmful dynamic effects and in some cases even to result in damage to the mechanism. Moreover, the mechanism proposed must be capable of taking up limited space in the folded-back position of the panels, in particular during the stage of launching of the satellite while at the same time providing a large and usually flat surface once the satellite has been put in orbit.

In the application which is more especially envisaged, there are already a number of known constructional arrangements which have the object of solving the problems raised by the design concept of the panel-operating mechanism. In particular, it has already been proposed to carry out the unfolding of the articulated elements which constitute the panels for carrying solar cells of an artificial satellite by making use of torsion-bar articulations in cooperating relation with one or a number of traction devices constituted by cables guided by pulleys, the assembly thus formed being associated with shock-absorbers for ensuring a uniform rate of unfolding of the elements.

These mechanisms, however, utilize part of the inherent flexibility of certain components for unfolding or folding-back the articulated elements and fail to ensure accurate and perfectly synchronous positioning of these elements during the different operations. Furthermore, the failure of a cable or even disengagement of this latter from the groove of a pulley is sufficient to make the mechanism inoperative.

The present invention is directed to a synchronizing mechanism of a wholly different conception, thus ensuring that unfolding or folding-back of articulated elements takes place in a precise and uniform manner with a remarkable degree of reliability whilst the angular displacement of the elements can be accurately controlled at each instant. The invention also makes it possible to ensure that the movement of the elements takes place at constant speed. The utilization of a number of drive motors either of the same type or of different types and operating either together or separately endows the mechanism under consideration with a degree of operational safety and reliability which is particularly appreciable.

In accordance with the invention, the synchronizing mechanism for the unfolding of articulated carrier elements placed in an outwardly extendable position on each side of a satellite body essentially comprises a system of gear-train units placed alternately at one end of a driving carrier element, said mechanism being adapted to cooperate with at least one drive motor for carrying out the folding-back or unfolding of said elements.

In accordance with a distinctive feature, each gear-train unit has three stages such that the first and the third stage are each constituted by a fixed pinion rigidly fixed on a hinge-pin between two adjacent elements, the second stage being formed by a rotating shaft provided at each end with other pinions in cooperating relation with the pinions of the first and third stages.

Further distinctive features of a synchronizing mechanism for the displacement of articulated elements and especially elements for carrying solar cells in an artificial satellite will be brought out in greater detail by the following description of one example of construction which is given by way of indication without any limitation being implied, reference being made to the single FIGURE of the accompanying drawing which illustrates a view in partial perspective of the mechanism under consideration.

In this FIGURE, the reference numeral 1 generally designates a panel constituted by a series of elements for carrying solar cells. Said elements have a generally rectangular shape and are pivotally coupled together, the panel being shown during unfolding with respect to the body or frame 2 of an artificial satellite, the constructional detail of which has little bearing on the invention and has consequently not been shown in the FIGURE. The counterpart of said panel 1 is intended to be placed symmetrically on the opposite side of the satellite body 2. In the example of construction shown in the drawing, said panel 1 comprises four successive carrier elements which are pivotally coupled together or so-called driving elements which are designated in the drawing by the references 3, 4, 5 and 6. In accordance with the invention, these four elements are so designed as to initiate relative and complementary angular displacements from one element to the next. The last element 6 is itself pivotally coupled to the end of the panel 1 on a last element 7 or so-called driven element of similar design.

In order to carry out the displacement of the element 3 with respect to the body 2, the synchronizing mechanism comprises a first gear-train unit which is generally designated by the reference numeral 8 and mounted at the bottom of the element 3. The relative angular displacement of the other successive carrier elements in the panel 1, namely the elements 4, 5, 6 and 7, is carried out from one element to the next by means of other gear-train units 9 of a similar type but having dimensions which may be modified with respect to the unit 8. Said units 8 and 9 are mounted in spaced relation along the short sides of the carrier elements 3 to 7 at the bottom and at the top of these latter in alternate sequence along the length of the panel 1. As can readily be understood, it would not constitute any departure from the scope of the present invention to contemplate any other arrangement of the gear-train units 8 and 9 insofar as concerns both the positioning of these latter with respect to the carrier elements 3 to 7 and the coupling of said units with respect to each other. Likewise it would be possible to contemplate the use of a single type of gear-train unit throughout the mechanism as a whole.

In the folded-back position, the carrier elements 3 to 7 of the panel 1 are applied against each other in a bellows-type assembly and are capable of coming into a position in which they bear against the satellite body 2 in order to take up the minimum space with this latter. This arrangement is primarily intended to facilitate launching of the satellite, unfolding of the panels being initiated only after the satellite has been put into orbit. The result achieved by the bellows-type assembly is that, during the unfolding stage, the carrier elements undergo angular displacement with respect to each other in two opposite directions as represented in the FIGURE by the arrows $F_1$ and $F_2$. Thus the odd-numbered elements 3, 5 and 7, for example, unfold with respect to the adjacent element and rotate in the direction of the arrow $F_1$ corresponding to the trigonometrical direction whilst the even-numbered elements and especially the elements 4 and 6 rotate in the opposite direction indicated by the arrow $F_2$.

The relative angular displacements having the same amplitude but of opposite direction which are assigned to each carrier element of the panel arise from the inherent character of the means adopted for controlling the synchronous movements of these elements and entailing the use of the gear-train units 8 and 9 in accordance with the invention. As shown in the drawing, these different elements are accordingly coupled together about hinge-joints 10 and 11 each having a hinge-pin $10_1$ or $11_1$ respectively. A driving pinion is rigidly fixed with respect to said hinge-pin at one end thereof and capable of rotating with this latter. Said hinge-pins are guided by means of conventional bearings designated respectively by the references $10_z$ or $11_z$. The hinge-joints 10 and 11 are advantageously limited in length so as to extend only at the top portion and bottom portion of each carrier element of the panel 1. This limitation in relative overall length permits an appreciable economy in weight of these hinge joints in the mechanism under consideration.

In the first gear-train unit 8 which is mounted between the satellite body 2 and the carrier element 3, the hinge-pins $10_1$ and $11_1$ which are placed respectively on each side of said element 3 are rigidly coupled on the one hand to the body 2 and on the other hand to the second carrier element 4 along the element 3 in the panel 1 so as to form a first stage and a third stage in conjunction with the two pinions $8_1$ and $8_2$ which are rigidly fixed to the two hinge-pins aforesaid. In order to provide a step-down gear reduction for ensuring that the set of articulated carrier elements extends at right angles to the satellite body 2 once the complete assembly has been unfolded, it is advantageously ensured that the diameter chosen for the first pinion $8_1$ is equal to double the diameter of the pinion $8_2$ which is provided between the elements 3 and 4. In fact, a rotation of the first carrier element 3 with respect to the body 2 through an angle of only 90° is automatically accompanied under these conditions by a rotation of the carrier element 4 through an angle of 180° with respect to said carrier element 3; this latter accordingly extends in a direction at right angles to the body 2 whereas the carrier elements 3 and 4 are again located in the line of extension of each other.

The second stage of the gear-train unit 8 which is mounted between the first and third stages constituted by the pinions $8_1$ and $8_2$ is formed by a transverse shaft $8_3$ on the ends of which are fixed two other identical pinions designated by the reference $8_4$. These pinions $8_4$ have the same diameter as the pinion $8_2$ in order to obtain end-to-end alignment of the carrier elements 3 and 4 in an outwardly-extended configuration. The shaft $8_3$ is guided and supported at the lower end of the carrier element 3 by means of two bearings $8_5$ which are rigidly fixed to said element.

The pinions $8_1$, $8_2$, $8_4$ of the gear-train unit 8 described in the foregoing are preferably constituted by bevel-pinions set at 90° and capable of cooperating with each other in the manner indicated in the foregoing. However, by way of alternative, these pinions could be replaced by pinions of another type, especially in the class of toothed wheels.

Similarly, the second gear-train units 9 provided between the carrier elements 3 and 4, then between the elements 4 and 5, 5 and 6 and finally 6 and 7 respectively comprise in each case a first and a third stage constituted by pinions $9_1$ having the same diameter and rigidly fixed at the end of the hinge-pins $10_1$ provided at the corresponding ends of said carrier elements. Said pinions $9_1$ are coupled together in each unit by means of a transverse shaft $9_3$ fitted at the end with two pinions $9_2$ having the same diameter as the pinions $9_1$ in order to be capable of engaging with these latter in a ratio of 1/1. In this manner, the rotation of each pinion which is produced by angular displacement of one of the carrier elements is transmitted to the other pinion by means of the transverse shaft with only one reversal of direction but with the same amplitude from one carrier element to the next.

From the features mentioned in the foregoing and especially by virtue of the serial arrangement of the gear-train units 8 and 9 disposed in alternate sequence on each side of the successive carrier elements in the panel 1, it is apparent that the opening and closure of the different panel elements are automatically synchronized with a continuous control of both the position and the speed of displacement of each element. The control of a single carrier element is sufficient to impart exactly corresponding movements to the other elements of the panel, with the result that all these elements are either placed in end-to-end alignment in the plane of the panel 1 at the end of travel or, on the contrary, folded-back in the form of a bellows-type assembly of said elements in juxtaposed planes.

The control of any one of the carrier elements can be carried out by producing direct action on one element, for example by means of a drive motor 12 mounted in the vicinity of the hinge-pin $11_1$ of the first element 3 and adapted to produce action on said element. Alternatively, control can be achieved indirectly by means of another drive motor 13 which produces a movement of rotation of the shaft $8_3$ of the second stage of the first gear-train unit 8. In fact, the movement of rotation of said shaft $8_3$ will similarly cause the displacement of the carrier element 3. Conversely, any movement of the carrier element will result in rotation of the shaft, this rotation being transmitted to the other units and then at successive points to the adjacent elements of the panel.

The two drive motors 12 and 13 can be combined under these conditions so as to ensure operational safety of the mechanism either separately or at the same time. Thus in the event of failure or unavailability of one of the two drive motors, operational safety can accordingly be ensured both in the direction of opening and in the direction of closure of the panel. It is readily apparent that the position of the drive motors 12 and 13 as contemplated in the foregoing is not given in any limiting sense. In accordance with the basic design principle of the mechanism under consideration, these motors can be placed on any of the other carrier elements of the panel assembly.

In all cases, it can in fact be noted that the position and the mode of coupling of the different pinions constituting the stages of each gear-train unit determine a suitable direction for the displacements of the different carrier elements which are coupled together. Thus, under the action of the torque $M_1$ applied to the shaft $8_3$ by the drive motor 13, said shaft will move at right angles about the hinge-pin $10_1$ which constitutes the shaft of the pinion $8_1$ and is rigidly fixed with respect to the satellite body 2 while following the direction of rotation indicated by the arrow $F_1$ and thus displacing the carrier elements 3. This displacement is made possible by means of the pinion $8_1$ which is rigidly coupled to the body 2 and against which the pinion $8_4$ is applied. As a result of rotation of the shaft $8_3$ produced by the torque $M_1$, a similar rotation is imparted at the same time to the pinion $8_2$ which is rigidly fixed to the carrier element 4, thus initiating the angular displacement of said carrier element 4 in the direction of the arrow $F_2$ with an identical angular amplitude but in the opposite direction. The movement of the first carrier element 3 will therefore be transmitted by means of the other gear-train units to all the carrier elements of the panel by means of the combined action of the torques $M_2$, $M_3$ and $M_4$ produced successively by the relative angular displacements of each carrier element and reversibly transmitted from one point to the next.

At the end of travel, locking of the carrier elements which takes place in particular when the panel 1 is in the fully unfolded position can be ensured by means of a stop 14 constituted by a magnet or like means.

As can readily be understood, the invention is clearly not limited either to the form of construction or to the application which have been more especially described in the foregoing with reference to the accompanying drawing but extends on the contrary to all alternative forms. In particular, the synchronizing mechanism considered could find other applications in many technical fields whenever it proves necessary to unfold a panel or any other unit of similar type comprising a plurality of articulated elements which are capable of unfolding and which must have perfectly synchronized angular movements of displacement while relative operations of these latter are being performed.

What we claim is:

1. A synchronizing mechanism for the folding and unfolding of panel-like elements adapted to carry solar cells comprising:
   a plurality of carrier elements coupled together in bellows-like manner by means of hinge-joints having associated hinge-pins;
   a plurality of gear-train units forming a linkage operably connecting said elements for synchronous movement relative to each other between a folded position and an unfolded position; and
   at least one motor for driving said gear-train unit to move said elements between said folded and unfolded positions.

2. A synchronizing mechanism according to claim 1, wherein each of said gear-train units includes three stages, a first stage and a third stage being constituted respectively by fixed pinions rigidly fixed on the respective hinge-pins of adjacent elements, said second stage including a rotating shaft provided with two pinions, each pinion being at an end of said shaft and intermeshed in cooperating relation with said pinions of said first and third stages, respectively.

3. A synchronizing mechanism according to claim 2, wherein the rotating shaft is placed at one end of an associated carrier element and is guided and supported by two bearings rigidly fixed to said associated element.

4. A synchronizing mechanism according to claim 2, wherein the pinion of the first stage of the unit for controlling the carrier element adapted to be adjacent to a satellite body has a pitch diameter which is double the pitch diameter of the other pinions.

5. A synchronizing mechanism according to claim 2, wherein the pinions of the gear-train units have approximately equal pitch diameter.

6. A synchronizing mechanism according to claim 1, wherein said drive motor is mounted to the hinge-pin of one hinge-joint.

7. A synchronizing mechanism according to claim 1, wherein said drive motor is mounted on a rotating shaft associated with said gear-train units.

8. A synchronizing mechanism according to claim 1, wherein movement of said mechanism is carried out by direct displacement of a carrier element.

9. A synchronizing mechanism according to claim 1, wherein movement of said mechanism is carried out by driving a rotating shaft in rotation.

10. A synchronizing mechanism according to claim 1, wherein the carrier elements comprise an interlocking device.

* * * * *

UNITED STATES PATENT AND TRADEMARK OFFICE
CERTIFICATE OF CORRECTION

PATENT NO. : 4,148,163
DATED : Apr. 10, 1979
INVENTOR(S) : Claude Chenin, Jean-Claude A. Vermalle It is certified that error appears in the above-identified patent and that said Letters Patent are hereby corrected as shown below:

Claim 6, line 2, delete "to" and substitute therefor --on--.

Signed and Sealed this

Seventeenth Day of July 1979

[SEAL]

Attest:

LUTRELLE F. PARKER

*Attesting Officer*     *Acting Commissioner of Patents and Trademarks*